United States Patent

Luffel

Patent Number: 5,455,810
Date of Patent: Oct. 3, 1995

[54] FLEXIBLE MEMBER TENSIONING APPARATUS

[75] Inventor: Robert Luffel, Greeley, Colo.

[73] Assignee: Hewlett-Packard Company, Palo Alto, Calif.

[21] Appl. No.: 254,049

[22] Filed: Jun. 3, 1994

[51] Int. Cl.$^6$ .................................................. G11B 11/22
[52] U.S. Cl. ............................ 369/36; 254/242; 414/280
[58] Field of Search ..................................... 474/101, 109, 474/115, 117; 254/242, 262; 414/280; 294/115; 369/38, 36, 191, 192

[56] References Cited

U.S. PATENT DOCUMENTS

| | | | |
|---|---|---|---|
| 4,607,354 | 8/1986 | Ishibashi et al. | 369/36 X |
| 4,653,948 | 3/1987 | Ikeda | 474/117 X |
| 4,998,232 | 3/1991 | Methlie et al. | 369/36 |
| 5,010,536 | 4/1991 | Wanger et al. | 369/36 |
| 5,014,255 | 5/1991 | Wanger et al. | 369/36 |
| 5,040,159 | 8/1991 | Oliver et al. | 369/34 |
| 5,043,962 | 8/1991 | Wanger et al. | 369/36 |
| 5,057,758 | 10/1991 | Oliver et al. | 318/603 |
| 5,062,093 | 10/1991 | Christie et al. | 369/36 |
| 5,101,387 | 3/1992 | Wanger et al. | 369/36 |
| 5,164,928 | 11/1992 | Oliver et al. | 369/34 |
| 5,184,336 | 2/1993 | Wanger et al. | 369/36 X |
| 5,226,779 | 7/1993 | Yeakley | 414/753 |
| 5,242,259 | 9/1993 | Yeakley | 414/751 |
| 5,277,540 | 1/1994 | Helms et al. | 414/751 |

*Primary Examiner*—Roger J. Schoeppel

[57] ABSTRACT

An apparatus for providing and maintaining tension in a flexible member. The apparatus includes a housing with openings therethrough for receiving the end portions of the flexible member. The apparatus further includes a retainer which maintains one end portion of the flexible member in fixed relationship with the housing, and a biasing device operatively attached to the other end portion of the flexible member and attached to the housing for applying biasing force to the flexible member. A method for tensioning a flexible member of a cartridge handling system is also disclosed.

13 Claims, 5 Drawing Sheets

FLEXIBLE MEMBER TENSIONING APPARATUS

BACKGROUND OF THE INVENTION

The present invention relates generally to an apparatus for providing and maintaining tension in a flexible member, and more particularly to a flexible member tensioning apparatus for use in conjunction with a cartridge engaging assembly in a cartridge handling system.

Optical disks are commonly used for storing musical works, audio-visual works, and computer-readable data. Such optical disks may be mounted in parallelepiped-shaped cartridges for purposes of storing and handling the disks. Also used in the computer industry for data storage are tape cartridges such as Digital Audio Tape (DAT) cartridges and 8-mm tape cartridges.

For large databases consisting of many disk or tape cartridges, a cartridge handling system may be provided for handling and storing the cartridges. Various features and components of a cartridge handling system are disclosed in U.S. Pat. Nos. 4,998,232 dated Mar. 5, 1991 for OPTICAL DISK HANDLING APPARATUS WITH FLIP LATCH of Methlie et al.; 5,014,255 dated May 7, 1991 for OPTICAL DISK CARTRIDGE HANDLING APPARATUS WITH PASSIVE CARTRIDGE ENGAGEMENT ASSEMBLY of Wanger et al.; 5,010,536 dated Apr. 23, 1991 for CARTRIDGE HANDLING SYSTEM of Wanger et al.; 5,043,962 dated Aug. 27, 1991 for CARTRIDGE HANDLING SYSTEM of Wanger et al.; 5,062,093 dated Oct. 29, 1991 for OPTICAL DISK INSERTION APPARATUS of Christie et al.; 5,101,387 dated Mar. 31, 1992 for LATERAL DISPLACEMENT CONTROL ASSEMBLY FOR AN OPTICAL DISK HANDLING SYSTEM of Wanger et al.; 5,184,336 dated Feb. 2, 1993 for LATERAL DISPLACEMENT CONTROL ASSEMBLY FOR AN OPTICAL DISK HANDLING SYSTEM of Wanger et al.; which are each hereby specifically incorporated by reference for all that is disclosed therein.

In general, a cartridge handling system may include a cartridge storage system for storing the cartridges at corresponding storage locations, a cartridge engaging assembly for retrieving and transporting cartridges, and support and displacement assemblies for the cartridge engaging assembly. The support and/or displacement assemblies may comprise one or more elongate flexible members (e.g., cables, belts, bands, or the like) under tension. Generally, each elongate flexible member is initially placed under tension upon mounting of the flexible member within the system, and that tensile force is maintained by applying a biasing force to the flexible member. Such a biasing force may be provided, for example, by including a biasing device in association with pulleys upon which a flexible member is mounted. Applying a biasing force to each flexible member serves to minimize the effects of flexible member stretching and/or slackening and maintains a substantially constant tensile force within the flexible member.

SUMMARY OF THE INVENTION

The present invention may comprise an apparatus for providing and maintaining tension in a flexible member. The apparatus may comprise a housing comprising at least two openings for receiving a first end portion and a second end portion of the flexible member. The apparatus may further comprise a retainer fixedly associated with the housing which maintains the first end portion of the flexible member in fixed relationship with the housing. The apparatus may further comprise a biasing device operatively attached to the second end portion of the flexible member and attached to the housing for applying biasing force to the flexible member along a biasing force axis.

The present invention may also comprise a cartridge handling system comprising a cartridge storage system for storing a plurality of cartridges at a plurality of corresponding storage locations, a cartridge engaging assembly which is adapted to engage and displace any of the cartridges, and a displacement assembly for displacing the cartridge engaging assembly. The displacement assembly may comprise first and second spaced apart pulleys, a flexible member under tension positioned around the pulleys, and a flexible member tensioning apparatus fixedly attaching the flexible member to the cartridge engaging assembly and applying a biasing force to the flexible member to maintain it under tension on the first and second pulleys.

The present invention may further comprise a method for tensioning a flexible member of a cartridge handling system comprising the steps of: (a) positioning the flexible member around first and second spaced apart pulleys; (b) attaching the first end portion of the flexible member to a first rigid member (e.g., a housing member); (c) attaching the second end portion of the flexible member to a biasing device; (d) attaching the biasing device to a second rigid member; and (e) placing the biasing device under tension through pivotal displacement of the second rigid member relative to the first rigid member.

BRIEF DESCRIPTION OF THE DRAWINGS

Illustrative and presently preferred embodiments of the invention are shown in the accompanying drawings in which.

DETAILED DESCRIPTION OF PREFERRED EMBODIMENTS OF THE INVENTION

Cartridge Handling System In General

Figure 1:
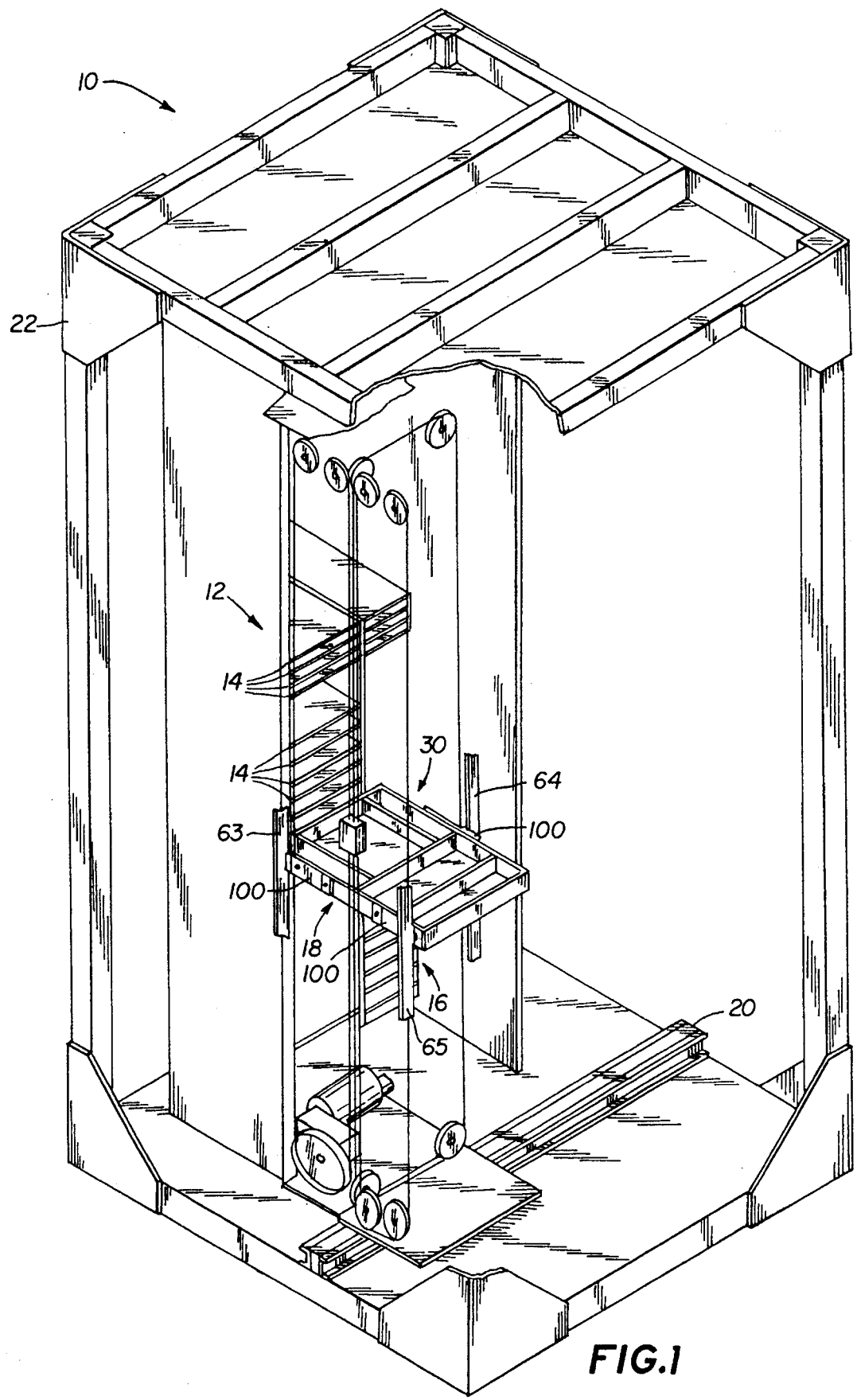
FIG. 1 is a partially cut-away, schematic front and left side perspective view of a cartridge handling system utilizing the flexible member tensioning apparatus of the present invention.

FIG. 1 illustrates the use of a flexible member tensioning apparatus 100 in a cartridge handling system 10. While use of one preferred embodiment of the invention in conjunction with a cartridge handling system will be described in detail below, it is to be understood that the present invention is not limited to this particular application or the specifically described embodiment.

The cartridge handling system 10 may comprise a cartridge storage system 12 for storing a plurality of cartridges 14 at a plurality of corresponding storage locations. A cartridge engaging assembly 18 may also be included for engaging and transporting any of the cartridges 14 between their corresponding storage locations and disk drives 16. The cartridge handling system 10 may further comprise a horizontal displacement assembly 20 for horizontally displacing the cartridge engaging assembly 18 and any cartridge 14 engaged thereby. The cartridge handling system 10 may further comprise a vertical displacement assembly 30 for vertically displacing the cartridge engaging assembly 18 and any cartridge 14 engaged thereby, and for supporting the cartridge engaging assembly 18. A protective housing 22 may also be provided as shown in FIG. 1.

Figure 2:
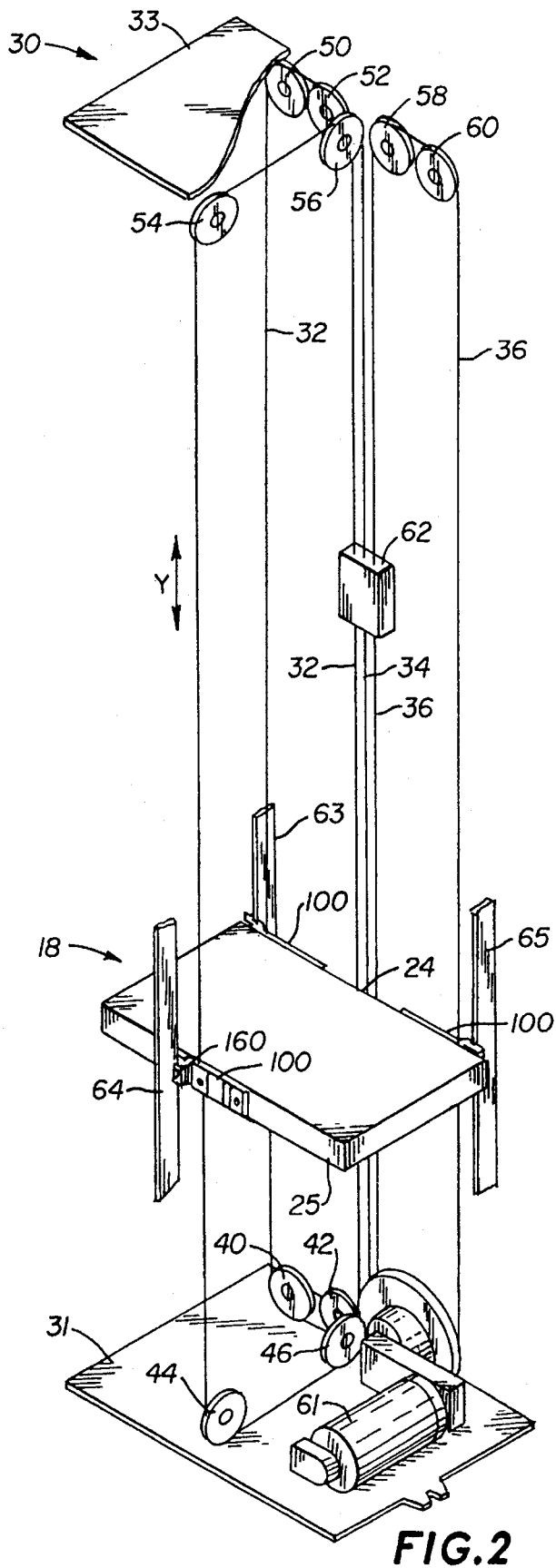
FIG. 2 is a partially cut-away, schematic rear and right side perspective view of a vertical displacement assembly of the cartridge handling system of FIG. 1.

As shown in FIG. 2, the vertical displacement assembly 30 may comprise a plurality of elongate flexible members 32, 34, 36 (e.g. cables, belts, bands, or the like) positioned around a plurality of pulleys 40, 42, 44, 46, 48, 50, 52, 54, 56, 58, 60 mounted on lower and upper plates 31, 33, respectively. More specifically, flexible member 32 may be positioned around pulley pair 40, 42 on the lower plate 31 and pulley pair 50, 52 on the upper plate 33. Flexible member 34 may be positioned around pulley pair 44, 46 on the lower plate 31 and pulley pair 54, 56 on the upper plate 33. Flexible member 36 may be positioned around a drive pulley 48 on the lower plate 31 and pulley pair 58, 60 on the upper plate 33. The drive pulley 48 may be operatively connected to a reversible motor 61. The elongate flexible members 32, 34, 36 may be coupled together at one or more positions by a coupler 62 or the like, which allows the elongate flexible members 32, 34, 36 to be driven together at the same rate.

The vertical displacement assembly 30 of FIGS. 1 and 2 may further comprise a plurality of guide rails 63, 64, 65 for guiding the vertical movement of the cartridge engaging assembly 18. Each flexible member tensioning apparatus 100 may include a guide engaging assembly 160 which may be slidingly engagable with a guide rail 63, 64, 65 as shown in these figures and described in further detail below.

Figure 3:
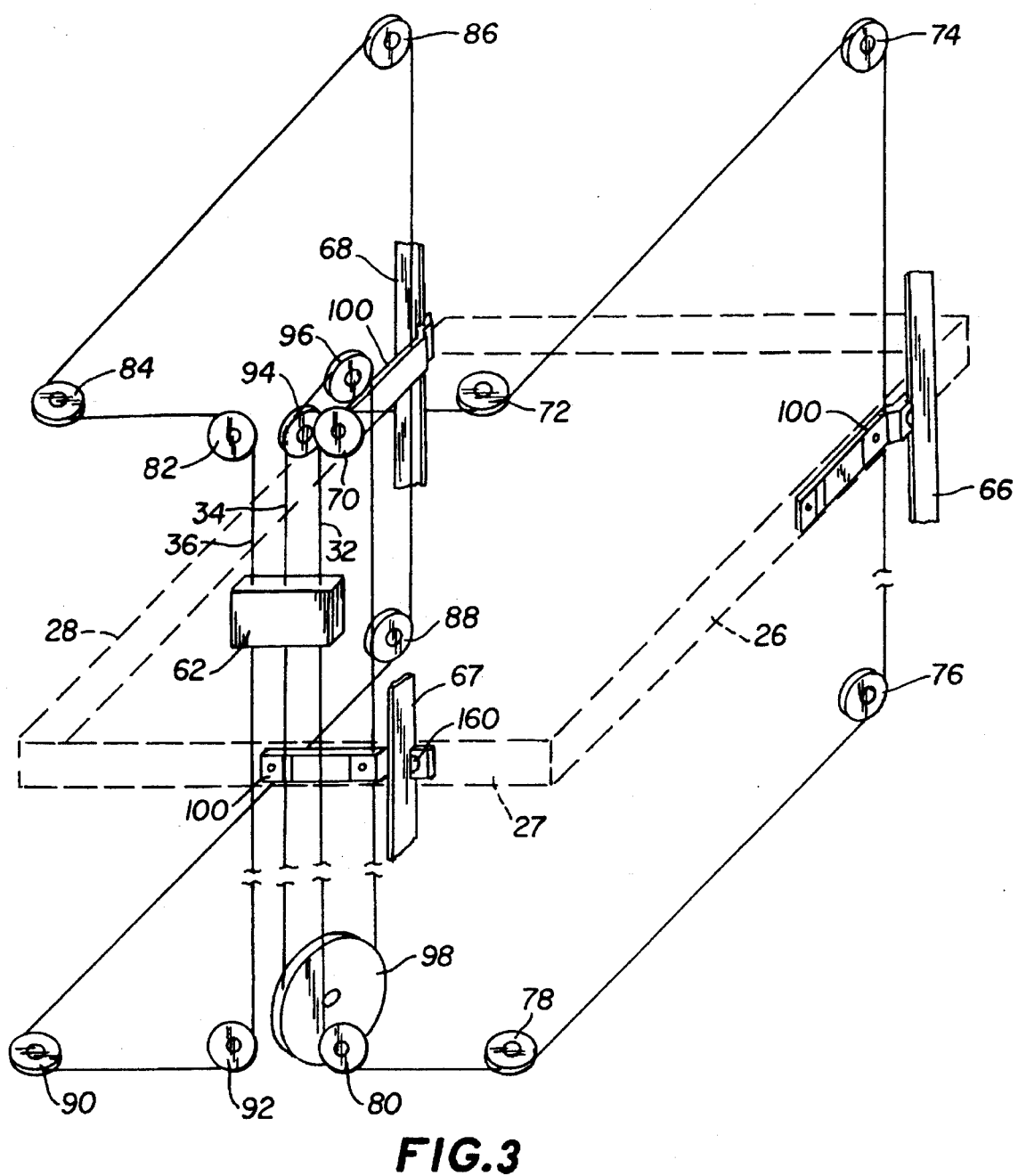
FIG. 3 is schematic, perspective view of another embodiment of the vertical displacement assembly of FIG. 2 utilizing a flexible member tensioning apparatus.

As shown in FIGS. 1–3, a flexible member tensioning apparatus 100 is preferably provided for each elongate flexible member 32, 34, 36 in order to individually tension each member 32, 34, 36 and to facilitate attachment of each member 32, 34, 36 to the cartridge engaging assembly 18. In the embodiment shown in FIGS. 1 and 2, a first and second substantially identical flexible member tensioning apparatuses 100 may be mounted on a first side 24 of the cartridge engaging assembly (FIG. 1), and a third substantially identical flexible member tensioning apparatus 100 may be mounted on a second side 25 of the cartridge engaging assembly 18 (FIG. 2).

Another, and presently preferred, embodiment of a vertical displacement assembly is illustrated in FIG. 3. The vertical displacement assembly of FIG. 3 may be substantially identical to that of FIG. 2, except for the differences noted below and described with different reference numerals. As shown in FIG. 3, a flexible member tensioning apparatus 100 is mounted on each of the first, second, and third sides 26, 27, 28, respectively, of the cartridge engaging assembly 18 (shown in phantom). This may be accomplished by providing a plurality of pulleys 70, 72, 74, 76, 78, 80, 82, 84, 86, 88, 90, 92, 94, 96 and drive pulley 98 in the positions shown in FIG. 3 so that flexible member 32 passes by the first side 26 of the cartridge engaging assembly 18, flexible member 34 passes by the second side 27 of the assembly 18, and flexible member 36 passes by the third side 28 of the assembly 18. Each of the flexible members 32, 34, 36 are received by a flexible member tensioning apparatus 100 mounted on the cartridge engaging assembly 18 as shown. The vertical displacement assembly 30 of FIG. 3 may include a plurality of guide rails 66, 67, 68, each guide rail 66, 67, 68 being slidingly engagable with a guide engaging assembly 160 of a flexible member tensioning apparatus 100 as described in further detail below.

Flexible Member Tensioning Apparatus

Figure 4:
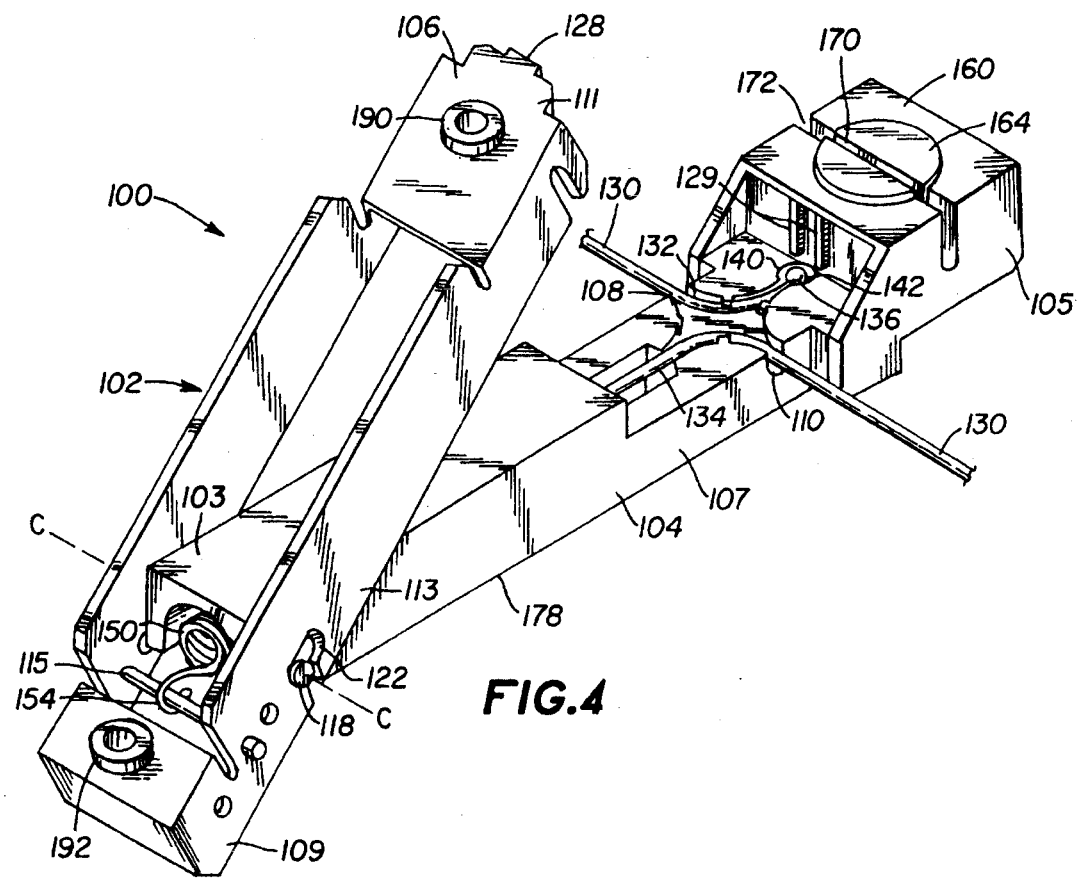
FIG. 4 is a front perspective view of a flexible member tensioning apparatus in an "open" position.
Figure 5:
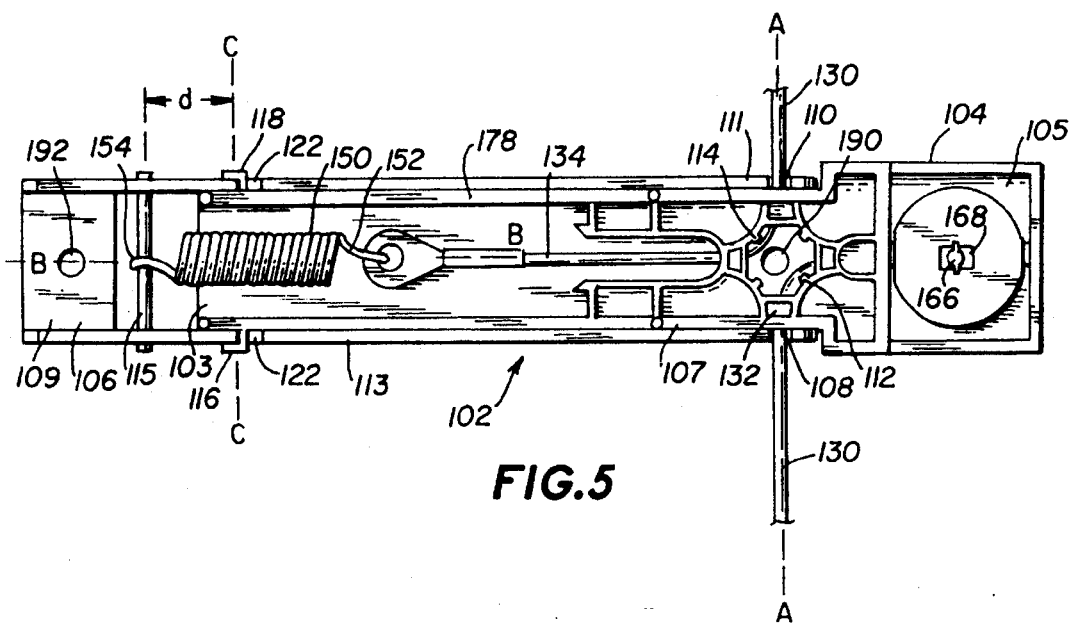
FIG. 5 is a rear plan view of a flexible member tensioning apparatus in a "closed" position.

As illustrated in FIGS. 4 and 5, the flexible member tensioning apparatus 100 may comprise a housing 102 which may be comprised of a first housing member 104 and a second housing member 106. The first housing member 104 may comprise a first end portion 103, a second end portion 105, and a flexible member receiving portion 107 positioned therebetween. The flexible member receiving portion 107 may comprise a first opening 108 for receiving a first end portion 132 of a flexible member 130, and a second opening 110 for receiving a second end portion 134 of the flexible member 130. It should be noted that the orientation of the flexible member tensioning apparatus 100 is irrelevant in that, alternatively, the first end portion 132 of the flexible member 130 may be received by the second opening 110, and the second end portion 134 of the flexible member 130 may be received by the first opening 108. The first and second openings 108, 110 may be substantially coaxial as shown in FIG. 4 and may define a flexible member receiving axis AA, FIG. 5. However, in another embodiment of the invention (not shown), these openings may be askew. The first housing member 104 may further comprise extending portions, e.g., 112, 114, to facilitating holding the first and second end portions 132, 134 of the flexible member 130 in place within the first housing member 104.

As shown in FIG. 4, the flexible member tensioning apparatus 100 may further comprise a retainer 140 which is fixedly associated with the housing 102. The first end portion 132 of the flexible member 130 is securely held within the retainer 140 so that the first end portion 132 is maintained in fixed relationship with the housing 102. More specifically, the first end portion 132 of the flexible member 130 may comprise an enlarged terminal end 136, and the retainer 140 may comprise a correspondingly-shaped recessed portion 142 which receives and retains the enlarged terminal end 136 therewithin. The retainer 140 may be integrally formed within the flexible member receiving portion 107 of the first housing member 104.

As best shown in FIG. 5, the flexible member tensioning apparatus may further comprising a biasing device 150 operatively attached at a first end 152 thereof to the second end portion 134 of the flexible member 130. The biasing device 150 may be attached at a second end 154 thereof to the second housing member 106, e.g., at a connector portion 115 thereof. The biasing device 150 applies a biasing force to the flexible member 130 along a biasing force axis BB. In a preferred embodiment of the invention, the biasing force axis BB extends transversely of, and most preferably perpendicularly to, the flexible member receiving axis AA. The biasing device 150 is preferably comprised of a coil spring having a spring axis disposed parallel to, and most preferably coaxial to, the biasing force axis BB. The length of the flexible member 130 is preferably such that, when positioned around pulleys as described above with reference to FIGS. 1–3, applying a biasing force to the flexible member 130 within the apparatus 100 places the flexible member 130 in tension. The amount of biasing force applied to the flexible member 130 may be dependent upon the length of the flexible member 130 and characteristics of the biasing device 150 (e.g., for a coil spring biasing device, such characteristics may include the spring constant and length of the spring).

Referring to FIGS. 4 and 5, the second housing member 106 may comprise a first end portion 109, a second end portion 111, and a pivot portion 113 positioned therebetween. The second housing member 106 is preferably pivotally attached at the pivot portion 113 thereof to the first housing member 104 at the first end portion 103 thereof. The second housing member 106 is pivotable relative to the first housing member 104 about a pivot axis CC. In a preferred embodiment, the pivot axis CC extends transversely of, and most preferably perpendicularly to, the biasing force axis BB as shown in FIG. 5. The second housing member 106 is also preferably completely removable from the first housing member 104. More specifically, the first housing member 104 may comprise coaxial protruding members 116, 118, FIG. 5, at the first end portion 103 thereof which define the pivot axis CC. The second housing member 106 may comprise, at the pivot portion 113 thereof, corresponding coaxial T-shaped slots 120, 122, the shape of which is best shown at 122 in FIGS. 6 and 7. The slots 120, 122 may receive the protruding members 116, 118 of the first housing member 104. The protruding members 116, 118 are rotatable within the slots 120, 122 around the pivot axis CC, and they may also be completely removed from the slots 120, 122.

Figure 7:
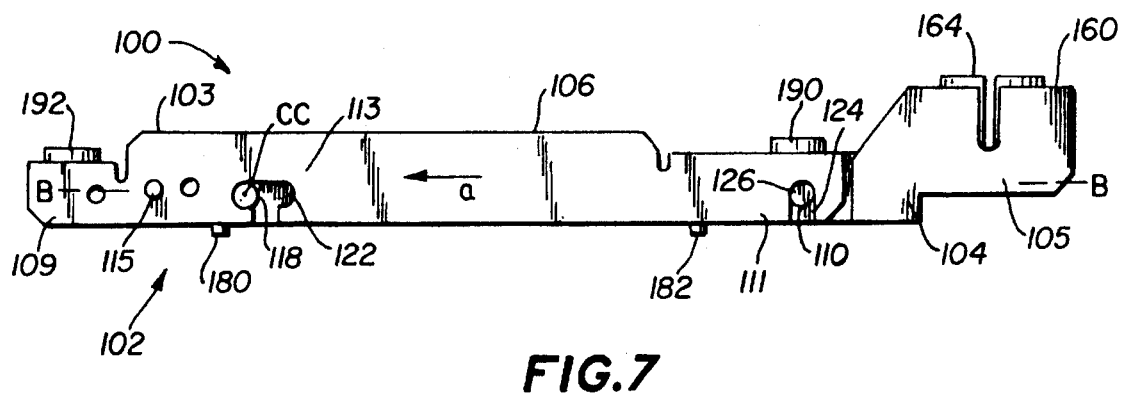
FIG. 7 is a side view of a flexible member tensioning apparatus in a "closed" position with the flexible member removed for clarity.

The second end portion 111 of the second housing member 106 may comprise U-shaped slots 124 (only one shown), FIG. 7, which correspond to and are substantially in alignment with the first and second openings 108, 110 of the first housing member 104. As best shown in FIG. 4, the second end portion 111 may further comprise a tab 128 which abuts against a shelf 129 to "lock" the second housing member 106 next adjacent to the first housing member 104 in a "closed" positioned which is described below.

The first housing member 104 is preferably constructed from a lightweight yet sturdy plastic material such as polycarbonate. The second housing member 106 is preferably constructed from a high-strength material such as steel.

Figure 6:
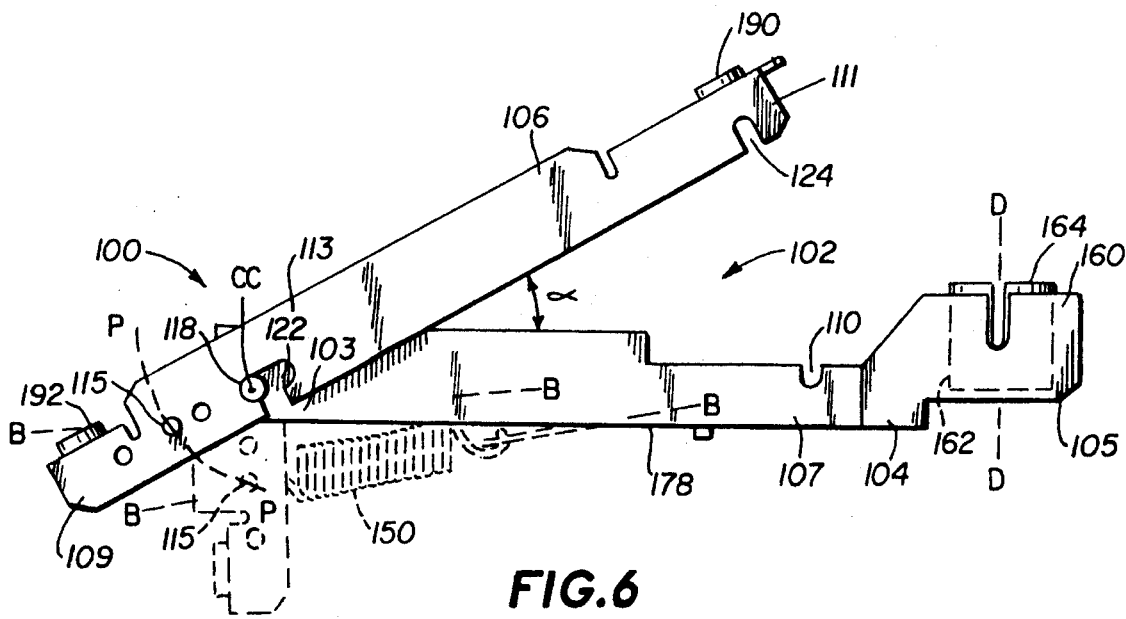
FIG. 6 is a side view of a flexible member tensioning apparatus in an "open" position with the flexible member removed for clarity, and a more fully open position shown in phantom.

Referring to FIGS. 4 and 6, the flexible member tensioning apparatus 100 may further comprise a guide engaging assembly 160 at the second end 105 of the first housing member 104. The guide engaging assembly 160 may be slidingly engagable with a guide rail (e.g., 63, 64, 65, FIGS. 1 and 2; 66, 67, 68, FIG. 3) of the cartridge handling system 10. The guide engaging assembly 160 may comprise a cylindrically-shaped recessed portion 162 (FIG. 6) in the first housing member 104 second end 105 which receives a correspondingly-shaped guide engaging device 164. The guide engaging device 164 is preferably rotatable within the recessed portion 162 around a rotation axis DD (FIG. 6), and may be rotatably secured to the first housing member 104 second end 105 such as by providing a protruding member 166 on the guide engaging device 164 which is "keyed" into a slot 168 in the housing member 104, as shown in FIG. 5. The guide engaging device 164 is preferably constructed from a lightweight, wear-resistant material such as nylon.

Referring to FIG. 4, the guide engaging device 164 further includes a first slot portion 170 with a width which conforms substantially to the width of a guide rail (e.g., 63, 64, 65, FIGS. 1 and 2; 66, 67, 68, FIG. 3). Included within the first housing member 104 is a second slot portion 172 which preferably has a larger width than the first slot portion 170. The first slot portion 170 may be slidably engagable with a guide rail as shown in FIGS. 1–3, but the guide rail preferably does not come in contact with the second slot portion 172.

In operation, when the cartridge engaging assembly 18 is travelling in the "y" direction (FIG. 2), the slot portions 170, 172 (FIG. 4) remain in substantial alignment with one another, but the first slot portion 170 is free to "float", i.e., move out of alignment with the second slot portion 172, as necessary to accommodate slight lateral movement of the guide rail.

Opening and Closing the Flexible Member Tensioning Apparatus

In an "open" position as shown in FIGS. 4 and 6, the second housing member 106 is pivotally attached to the first housing member 104 at the first end portion 103 of the first housing member 104 and at the pivot portion 113 of the second housing member 106. The second housing member 106 second end portion 111 is detached and spaced away from the first housing member 104 flexible member receiving portion 107. A more fully open position of the first end portion 109 of the second housing member 106 is shown in phantom in FIG. 6.

In a "closed" position as shown in FIGS. 5 and 7, the second housing member 106 is pivotally attached to the first housing member 104, and the second housing member 106 second end portion 111 is next adjacent to the first housing member 104 flexible member receiving portion 107 as shown. In the closed position, alignment of the slots 124 in the second housing member 106 with the openings 108, 110 in the first housing member 104 may form substantially circular holes 126 (only one shown), FIG. 7, through which the flexible member 130 (FIGS. 4 and 5) may pass.

To open the flexible member tensioning apparatus 100 from a closed position, the second housing member 106 must be displaced slightly in direction "a" (FIG. 7) to release the tab 128 on the second housing member 106 from abutment with the shelf 129 on the first housing member 104. The second housing member 106 is then pivoted counterclockwise around pivot axis CC (FIGS. 4 and 5) to an open position (FIGS. 4 and 6).

To close the flexible member tensioning apparatus 100 from an open position, the second housing member 106 is pivoted clockwise around pivot axis CC (FIGS. 4 and 5) until the second housing member 106 is next adjacent to the first housing member 104 as shown in FIG. 7.

Since the connector portion 115 is spaced away from the pivot axis CC by a distance "d" (FIG. 5), pivotal displacement of the second housing member 106 relative to the first housing member 104 causes displacement of the connector portion 115 along an arcuately-shaped path PP (FIG. 6). Thus, the position of the connector portion 115 to which the biasing device 150 is attached depends upon the relative degree of openness of the apparatus 100. In other words, in a more fully open position such as that shown in phantom in FIG. 6, the connector portion 115 is positioned relatively close to the flexible member receiving portion 107. In the position shown in solid lines in FIG. 6, the connector portion 115 is positioned farther away from the flexible member receiving portion 107. In the fully closed position shown in FIGS. 5 and 7, the connector portion 115 is positioned the farthest away from the flexible member receiving portion 107.

Furthermore, the flexible member 130 (FIGS. 4 and 5) is preferably of such a length so that, in its natural state, the flexible member 130 second end portion 134 is positioned within or extends only slightly beyond the flexible member receiving portion 107. Since the flexible member 130 second end portion 134 is attached to the biasing device 150 which is attached to the connector portion 115 as shown in FIG. 5, the amount of biasing force applied to the flexible member 130 by the biasing device 150 is directly related to the position of the connector portion relative to the flexible member receiving portion 107. More specifically, in the position shown in phantom in FIG. 6, little or no biasing force is applied to the flexible member 130. In the fully closed position shown in FIGS. 5 and 7, the maximum amount of biasing force available from the apparatus 100 is applied to the flexible member 130.

It can be seen from FIG. 6 that the position of the biasing device 150 and orientation of the biasing force axis BB also depend upon the relative degree of openness. In other words, from the more fully open position shown in phantom, to the position shown in solid lines, to the closed position shown in FIGS. 5 and 7, the biasing force axis BB moves closer to the pivot axis CC and crosses the pivot axis CC at some point. In one embodiment of the invention, which is presently the preferred embodiment, the biasing force axis BB crosses the pivot axis CC when the angle "α" (FIG. 6) between the first housing member 104 and the second housing member 106 is relatively small, e.g., on the order of about 5° –25°. Because the pivot axis CC is positioned off-center, i.e., on the first end portion 103 of the first housing member 104, the biasing force will cause the flexible member tensioning apparatus 100 to be biased toward the closed position when the biasing force axis BB crosses or moves beyond the pivot axis CC, i.e., when the angle "α" between the first housing member 104 and the second housing member 106 is relatively small (near-closed position) or zero (closed position). Such a design provides stability to the apparatus 100 when it is in a closed position so that it remains in such position, and it discourages the apparatus 100 from undesirably snapping open when it is in a near-closed position. It also allows provides sufficient leverage to easily place a large tensile force on the flexible member 130.

Using the Flexible Member Tensioning Apparatus In a Cartridge Handling System

To use the flexible member tensioning apparatus 100 in a cartridge handling system 10 as shown in FIGS. 1–3 for tensioning one or more flexible members 32, 34, 36 therein, each flexible member (e.g., 32) for which tensioning is desired is initially positioned around the pulleys (e.g., 40, 42, 50, 52, FIGS. 1–2; or 70, 72, 74, 76, 78, 80, FIG. 3) as shown and described above with reference to FIGS. 1–3. With reference to FIGS. 4–6 below, it is to be understood that flexible member 130 may refer to any of flexible members 32, 34, 36 of FIGS. 1–3.

The flexible member tensioning apparatus 100 may initially be in an open position as described above and shown in FIGS. 4 and 6, or, alternatively, the second housing member 106 may initially be completely removed from the first housing member 104 (not shown). However, at some point prior to or within the below sequence of events, the flexible member tensioning apparatus 100 must be placed in an open position, with the second housing member 106 pivotally attached to the first housing member 104. Also, each flexible member tensioning apparatus 100 should be oriented outwardly, i.e., so that surface 178 (FIGS. 6 and 7) of the apparatus 100 will be directly adjacent to the cartridge engaging assembly 18 (FIGS. 1–3) of the cartridge handling system 10.

Referring now to FIGS. 4 and 5, the first end portion 132 of the flexible member 130 is positioned within the first opening 108 of the housing 102, and the second end portion 134 of the flexible member 130 is positioned within the second opening 110 of the housing 102. The first end portion 132 of the flexible member 130 is secured to the retainer 140 (FIG. 4) as described above with respect to the retainer 140. The second end portion 134 of the flexible member 130 is attached to the biasing device 150 (FIG. 5) as described above with respect to the biasing device 150. The biasing device 150 is then attached to the second housing member 106 connector portion 115, also as described above. As previously mentioned, by more fully opening the apparatus, e.g., to the position shown in phantom in FIG. 6, the biasing device 150 may be allowed to remain in a state of reduced tension or no tension during attachment to connector portion 115.

The second housing member 106 is then pivotally displaced in a clockwise direction about the pivot axis CC until the flexible member tensioning apparatus 100 is in the closed position, FIGS. 5 and 7, thereby placing the flexible member 130 in tension. As previously mentioned, the biasing device 150 is preferably a coil spring having a spring axis which is coaxial with the biasing force axis BB. Such a spring will cause a substantially constant tensile force to be applied to the flexible member 130 even if its length changes slightly due to heating, cooling, or fatigue.

The above steps should be performed in conjunction with each flexible member (e.g., 32, 34, 36) in the cartridge handling system 10, FIGS. 1–3, for which tensioning is desired. To mount each apparatus 100 to the cartridge engaging assembly 18, the cartridge engaging assembly 18 is placed between the flexible member tensioning apparatuses 100 and the flexible members 32, 34, 36 as shown in FIGS. 1–3. Each apparatus 100 is then aligned and mounted to the cartridge engaging assembly 18. To facilitate alignment of each flexible member tensioning apparatus 100 on the cartridge engaging assembly 18, each apparatus 100 may comprise a plurality of pegs (e.g., 180, 182, FIG. 7) or the like on surface 178 which may be aligned with and then placed within predetermined holes (not shown) on the cartridge engaging assembly 18, FIGS. 1 and 2. Furthermore, each flexible member tensioning apparatus 100 may comprise mounting holes 190, 192 as shown in FIGS. 4 and 5 which correspond to mounting holes (not shown) on the cartridge engaging assembly 18, FIGS. 1 and 2, to receive screws (not shown) or the like for securely mounting each flexible member tensioning apparatus 100 to the cartridge engaging assembly 18. Since each flexible member 32, 34, 36 is fixedly attached to a flexible member tensioning apparatus 100, such mounting of each flexible member tensioning apparatus 100 to the cartridge engaging assembly 18 serves to fixedly attach each flexible member 32, 34, 36 to the cartridge engaging assembly 18.

Advantages of the Preferred Embodiment of the Present Invention

The flexible member tensioning apparatus 100 provides and maintains relatively constant tensioning of a flexible member 130. The flexible member tensioning apparatus 100 has very few components, no moving components, and is thus relatively inexpensive to produce. The apparatus is relatively easy to assemble, and no additional tools are needed to place a large tensile force on a flexible member 130.

Used in conjunction with a cartridge engaging assembly 18, the flexible member tensioning apparatus 100 also serves to attach the ends of the flexible member 130 to the cartridge engaging assembly 18. The apparatus 100 may also include a guide engaging assembly 160 which may be used in conjunction with a guide rail to assist in guiding the vertical displacement of the cartridge engaging assembly 18. Providing a biasing force which is applied perpendicularly to the orientation of the portion of the flexible member 130 entering the apparatus 100 minimizes the height of the flexible member tensioning apparatus 100. Providing an apparatus 100 mounted on a cartridge engaging assembly 18 eliminates the need for a biasing device located above or below the cartridge engaging assembly 18, thereby minimizing the overall height of the cartridge handling system.

Other Embodiments

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

I claim:

1. An apparatus for providing and maintaining tension in a flexible member of a cartridge handling system, said flexible member having a first end portion and a second end portion, comprising:
    a) a housing comprising at least two openings, said openings receiving said first end portion and said second end portion of said flexible member;
    b) a retainer fixedly associated with said housing which maintains said first end portion of said flexible member in fixed relationship with said housing; and
    c) a biasing device operatively attached to said second end portion of said flexible member and attached to said housing, said biasing device applying biasing force to said flexible member along a biasing force axis.

2. The invention of claim 1 wherein said openings are substantially coaxial and define a flexible member receiving axis.

3. The invention of claim 2, said biasing force axis extending transversely of said flexible member receiving axis.

4. The invention of claim 1, said housing comprising:
    a) a first housing member; and
    b) a second housing member pivotally attached to said first housing member about a pivot axis extending transversely of said biasing force axis.

5. The invention of claim 4, said biasing device being attached to said second housing member at a position displaced from said pivot axis, whereby said biasing device is displaceable relative to said first housing member through pivotal displacement of said second housing member relative to said first housing member.

6. The invention of claim 5, said second housing member being removably attached to said first housing member, said biasing device being removably attached to said second housing member, and said retainer being located within said first housing member.

7. The invention of claim 1, said biasing device comprising a coil spring having a spring axis disposed parallel to said biasing force axis.

8. The invention of claim 1, said apparatus being mounted on a cartridge engaging assembly in a cartridge handling system.

9. The invention of claim 8, said apparatus further comprising a guide engaging assembly which is slidingly engagable with a guide rail of said cartridge handling system.

10. The invention of claim 9, said guide engaging assembly comprising:
    a) a recessed portion in said housing;
    b) a guide engaging device rotatably positioned within said recessed portion, said guide engaging device being rotatable around a rotation axis, said guide engaging device having a first slot portion;
    c) a second slot portion in said housing;
    d) said first slot portion being slidingly engagable with said guide rail.

11. A method for tensioning a flexible member of a cartridge handling system, said flexible member having a first end portion and a second end portion, said method comprising:
    a) positioning said flexible member around first and second spaced apart pulleys;
    b) attaching said first end portion of said flexible member to a first rigid member;
    c) attaching said second end portion of said flexible member to a biasing device;
    d) attaching said biasing device to a second rigid member; and
    e) placing said biasing device under tension through pivotal displacement of said second rigid member relative to said first rigid member.

12. The method of claim 11, said step of placing said biasing device under tension comprising applying a tensioning force to said biasing device in a direction transverse to an axis extending along said flexible member between said first and second pulleys.

13. The method of claim 11 further comprising:
    f) mounting said first rigid member and said second rigid member to a cartridge engaging assembly of a cartridge handling system.

* * * * *